US007032935B1

(12) United States Patent
Levy et al.

(10) Patent No.: US 7,032,935 B1
(45) Date of Patent: Apr. 25, 2006

(54) SELF ENERGIZING CONNECTOR

(76) Inventors: David Levy, 115 Glaser Dr., #A-4, Lafayette, LA (US) 70508; Paul Dodd, 39203 Everett La., Ponchatoula, LA (US) 70454

( * ) Notice: Subject to any disclaimer, the term of this patent is extended or adjusted under 35 U.S.C. 154(b) by 0 days.

(21) Appl. No.: 10/785,568

(22) Filed: Feb. 24, 2004

Related U.S. Application Data

(60) Provisional application No. 60/461,072, filed on Apr. 8, 2003.

(51) Int. Cl.
*F16L 19/06* (2006.01)
*F16L 19/00* (2006.01)

(52) U.S. Cl. ...................... 285/341; 285/339; 285/342; 285/353; 285/385

(58) Field of Classification Search ................ 285/339, 285/341, 342, 353, 385, 389
See application file for complete search history.

(56) References Cited

U.S. PATENT DOCUMENTS 4,002,345 A * 1/1977 Jankowiak et al. ......... 277/606
4,082,326 A * 4/1978 Bryson ....................... 285/238
4,304,422 A * 12/1981 Schwarz ....................... 285/4
4,529,231 A * 7/1985 Greenawalt ................. 285/342
4,776,618 A * 10/1988 Barree ........................ 285/341
4,826,218 A * 5/1989 Zahuranec .................. 285/342
5,074,599 A * 12/1991 Wirbel et al. ................ 285/93
5,192,095 A 3/1993 Behrens
6,168,211 B1 * 1/2001 Schorn-Gilson ............ 285/348
6,345,845 B1 * 2/2002 Johnston .................. 285/382.7
6,629,708 B1 * 10/2003 Williams et al. ......... 285/382.7
6,851,729 B1 * 2/2005 Gibson ....................... 285/341
2004/0061333 A1 * 4/2004 Chu ........................... 285/339
2004/0251681 A1 * 12/2004 Williams et al. .............. 285/93

* cited by examiner

*Primary Examiner*—James M. Hewitt
(74) *Attorney, Agent, or Firm*—Buskop Law Group, P.C.; Wendy Buskop

(57) ABSTRACT

The self energizing tube connector for engaging a pressurizable part made of a tube capable of sustaining pressures up to 50,000 psi without deforming is made of an upstream tube end and a downstream tube end; a ferrule with a front and rear ferrule, a lifting component that engages the front ferrule to cause a upstream seal to form between pressurizable part and tube, and a downstream seal to form between the front ferrule and the tube; and a coupling nut for sliding over the tube and disposed downstream of the rear ferrule for engaging the pressurizable part, wherein the coupling nut is adapted to tighten against the rear ferrule, front ferrule, and lifting mechanism to compress the rear ferrule, front ferrule, and lifting mechanism against the pressurizable part and the tube.

12 Claims, 4 Drawing Sheets

SELF ENERGIZING CONNECTOR

The present application claims priority to co-pending U.S. Provisional Patent Application Ser. No. 60/461,072 filed on Apr. 8, 2003, entitled "Self Energizing Connector".

FIELD

The present embodiments relate to a coupling device for high pressure tubing using a coupling nut to effect a pressure-tight connection to other system components.

BACKGROUND

Known connectors for high pressure applications have problems, wherein the tubes pop out of their engagements at high pressure. After considerable testing, it was determined if the tube could be constrained, then the tubes could be pressured to very high pressures without leaking.

One such tube connector is described in U.S. Pat. No. 5,192,095. In the patent, a tube connector is described that provides a coupling device for high pressure threaded pipe connection to a coupling body with a standard 24-degree connector, a coupling nut to establish a pressure tight connection and a shaped pipe or a connection stub for connection to other system components. An adapter ring is proposed with a cylindrical internal bore and radially progressing and/or domed end ring faces of different sizes, at least one of which is formed as a sealing face fitted with a ring seal, to each of which an axially directed cylinder outer face is juxtaposed, between which a 24-degree outer bevel is arranged to adapt to the coupling body. The ring face of the adapter ring which when fitted is directed towards the connection stub or the flared flange of the shaped pipe is provided with an annular groove to accept a ring seal or an o-ring. However, this connector still pops out of its engagement position at high pressures.

The present invention was designed to overcome these problems with improved sealing at high pressures.

SUMMARY

The self energizing tube connector for engaging a pressurizable part and associated is for use with pressurizable parts, such as a subsea Christmas tree or a BOP. The tube is capable of sustaining pressures up to 50,000 psi without deforming having an upstream tube end and a downstream tube end. Over this tube is placed a ferrule assembly having three basic parts, a front ferrule, a rear ferrule and a lifting component, which in the preferred embodiment is of a tapered construction. The lifting component slidingly engages the front ferrule thereby forming both an upstream seal between a pressurizable part, such as a blow out protector (BOP) and the tube and a downstream seal between the front ferrule and the tube. A coupling nut slides over the tube and is located downstream of the rear ferrule for engaging the pressurizable part. The coupling nut is adapted to tighten against the rear ferrule, front ferrule and lifting mechanism to compress the rear ferrule, front ferrule and lifting mechanism against the pressurizable part and the tube.

The method for using the tube connector with a pressurizable part entails sliding a coupling nut, such as a jam nut, over a tube. Next, a rear ferrule is slid over the tube. A front ferrule is slid over the tube after the rear ferrule, and then a lifting component is slid over the tube forming a ferrule assembly. Next, the tube with ferrule assembly is inserted into the pressurizable part. Pressure is then applied using the coupling nut onto the ferrule assembly and the ferrule assembly then forms both an upstream seal and a downstream seal between the tube and the pressurizable part.

BRIEF DESCRIPTION OF THE DRAWINGS

The present embodiments will be explained in greater detail with reference to the appended Figures.

The present embodiments are detailed below with reference to the listed Figures.

DETAILED DESCRIPTION OF THE PREFERRED EMBODIMENTS

Before explaining the present embodiments in detail, it is to be understood that the embodiments are not limited to the particular embodiments herein and it can be practiced or carried out in various ways.

The present embodiments are directed to a tube connector and a method for using the tube connector.

Figure 1:
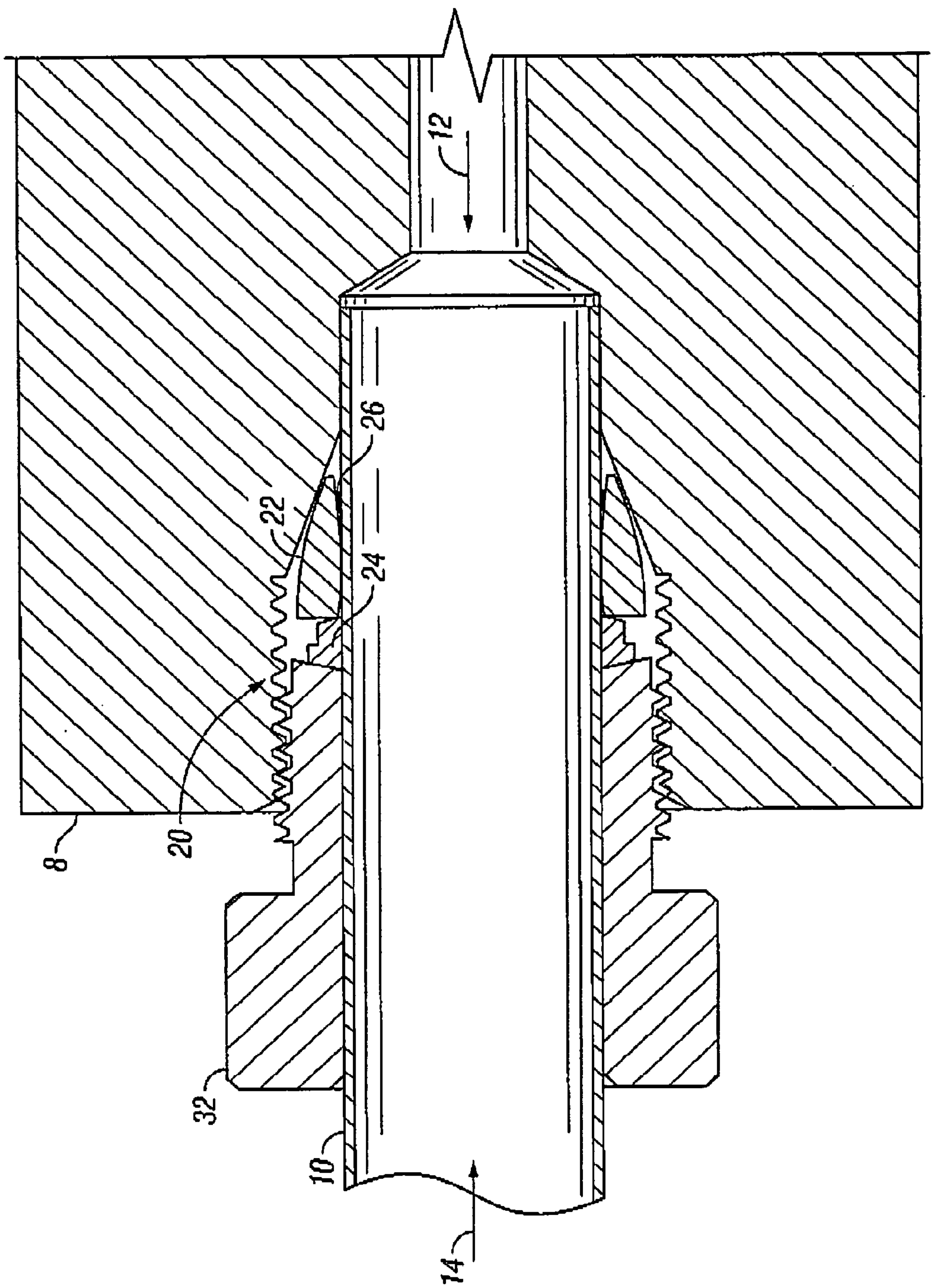
FIG. 1 depicts a cross sectional view of the tube in the pressurized part.

FIG. 1 shows a cross sectional view of the tube in a pressurized part according to the invention.

The tube connector engages a pressurizable part 8. The tube connector is made from a tube 10 capable of sustaining pressures from about 1 atm to about 50,000 psi without deforming. Tube 10 has an upstream tube end 12 and a downstream tube end 14. A ferrule assembly 20 is shown slidingly engaging the tube 10. FIG. 1 also shows the ferrule assembly 20 having the three basic components, the front ferrule 22, the rear ferrule 24 and the lifting component 26. A coupling nut 32 is shown in a slidingly engagement around tube 10. The coupling nut 32 is preferably a jam nut, but could also be a compression nut or similar compression device for exerting pressure on the tube 10.

Figure 2:
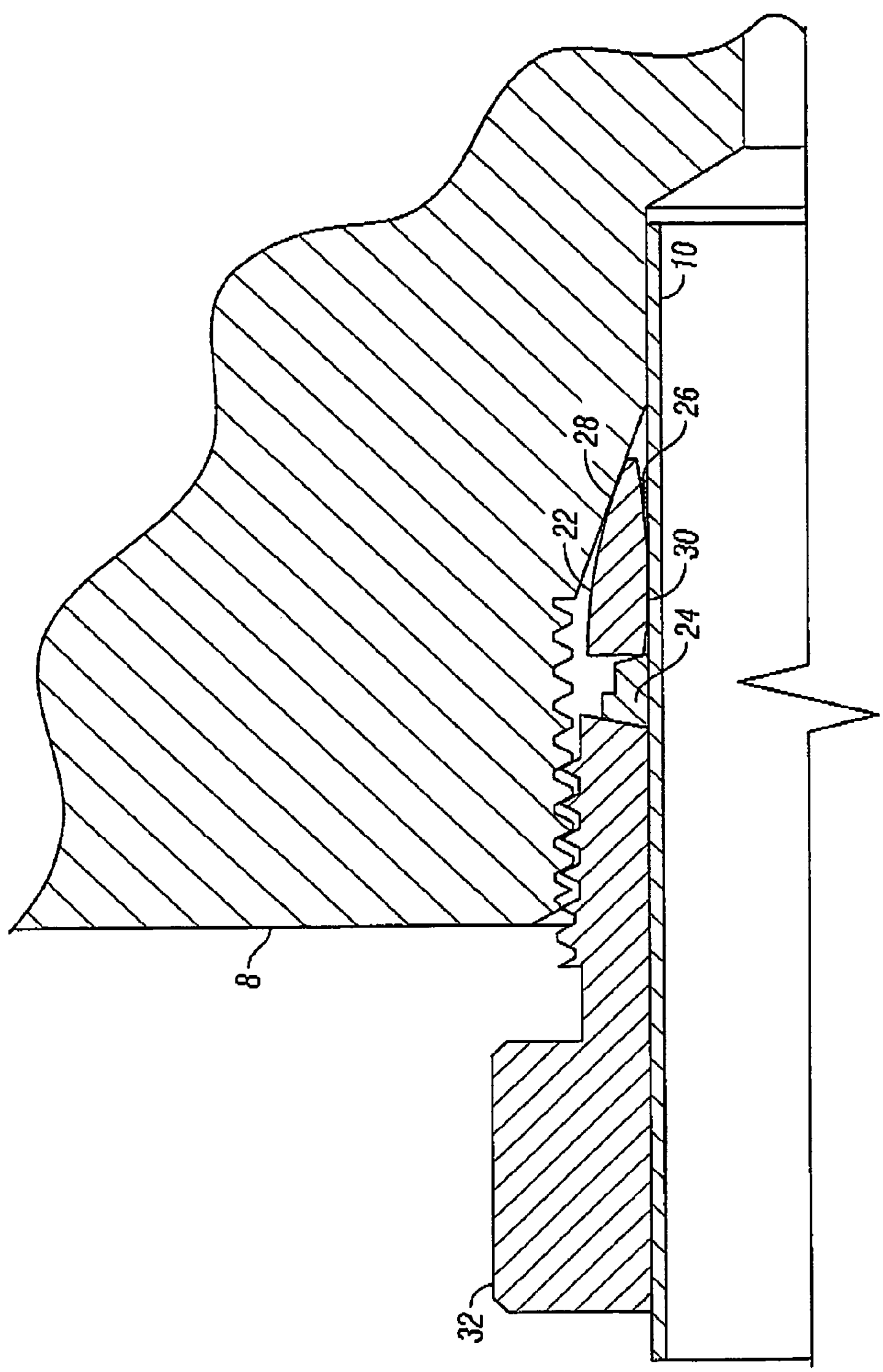
FIG. 2 depicts a detailed cross section of the connector.

FIG. 2 shows a detail of the ferrule assembly which consists of a front ferrule 22; a rear ferrule 24 and a lifting component 26. In a preferred embodiment, each ferrule is of a ring construction for fitting around the tube. The front ferrule 22 slidingly engages the rear ferrule 24. The lifting component slidingly engages the tube 10 and the front ferrule 22.

The lifting component 26 preferably has a wedge shape.

The lifting component, when it slidingly engages with pressure from the coupling nut 32 the front ferrule 22 forms an upstream seal 28 between pressurizable part 8 and tube 10. Simultaneously with this force from the coupling nut or jam nut 32, a downstream seal 30 is formed.

The coupling nut 32 slides over the tube 10 and is disposed downstream of the rear ferrule 24 for engaging the pressurizable part 8. The coupling nut can be tightened against the ferrule assembly 20 which consists of the rear ferrule, front ferrule and lifting mechanism. The coupling nut applies force to the rear ferrule, front ferrule and lifting mechanism against pressurizable part 8 and the tube 10, typically deforming the rear ferrule, front ferrule and lifting mechanism in order to create the two simultaneous seals.

In a preferred embodiment, the tube can have an outer diameter of between about 1/16 inch and up to 12 inches. In a more preferred embodiment, the tube has an outer diameter of between about 1/8 inch and about 1 inch.

It is contemplated to be within the scope of the invention that the front ferrule, rear ferrule and lifting components are made from a deformable material such as metal or plastic and can deform upon compression due to the coupling nut.

It is contemplated that the tube 10 could be a metal tube or a plastic tube. The preferred metal is contemplated to be stainless steel. Alternatively, a duplex material such as a Duplex 2205 or Duplex 2207 corrosion resistant material available from Gibson of Bridgewater, N.J. could be used.

The tube connector of the present invention is contemplated to sustain without failure, pressures which range between about 1 atm and up to about 50,000 psi, more preferably between 1 atm and 25, 000 psi.

As to the coupling nut for use in the invention, in the most preferred embodiment, this nut is a jam nut with threads for engaging threads of a pressurizable part.

This invention is contemplated for use with pressurizable parts such as: down hole safety valves, chemical injection assemblies, tubing hangers, blow out preventors, subsea Christmas trees, or packers.

Figure 3:
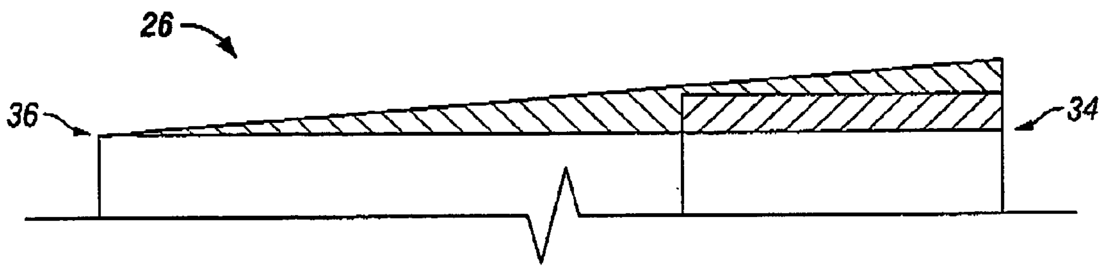
FIG. 3 depicts a detail of the lifting component usable in the tube connector.

FIG. 3 is a detail of the lifting component 26 in the tube connector of the invention. In a preferred embodiment, the lifting component has a ring shape. The ring has an upstream edge 34 and a downstream edge 36 and wherein the upstream edge is larger in diameter than the downstream edge 36.

Figure 4:
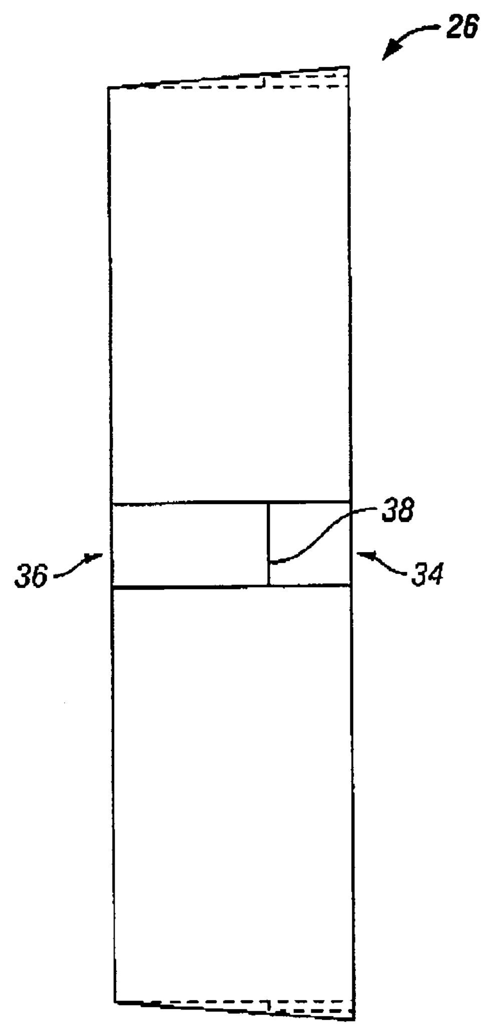
FIG. 4 depicts a top view of an alternative embodiment of the lifting device of FIG. 3.

FIG. 4 is a top view of the lifting component 26 wherein the lifting component can additionally comprise a groove 38 disposed adjacent the upstream edge 34 to prevent sealing at the upstream edge of the lifting component 26.

Figure 5:
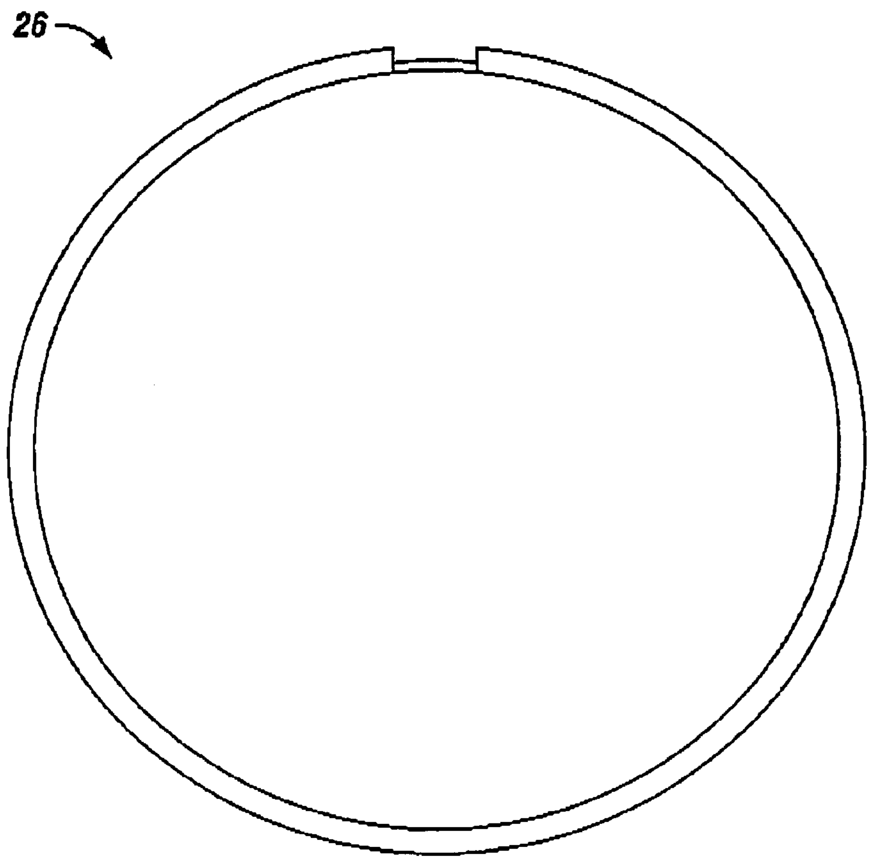
FIG. 5 depicts an end view of the lifting device of FIG. 3.

FIG. 5 is an end view of the lifting component of FIG. 3.

Figure 6:
FIG. 6 depicts a detail of the front ferrule usable in the tube connector.

FIG. 6 is a detail of the front ferrule 22 usable in the tube connector of the invention. In the preferred embodiment, the front ferrule has a conical shape for engaging the pressurizable part. The front ferrule 22 has a front portion 40 for engaging the lifting component 26 and a back portion 42 for engaging the rear ferrule 24. In a preferred embodiment this front ferrule is a solid material having a diameter which is slightly less than the inner diameter of the tube.

The rear ferrule 24 is a ring shape and preferably tapered on each end. In the most preferred embodiment the rear ferrule acts like a wedge. Preferably this rear ferrule is constructed from solid steel.

The invention also relates to a method for using a tubular connector with a pressurizable part, such as a BOP or subsea Christmas trees. The method begins by sliding a coupling nut over a tube, sliding a rear ferrule over the tube, sliding a front ferrule over the tube, and sliding a lifting component over the tube. Sliding a lifting component over the tube forms a ferrule assembly over the tube.

The method ends by inserting the tube into a pressurizable part and applying pressure using a coupling nut to the ferrule assembly forming both an upstream seal and a downstream seal between the tube and the pressurizable part.

The method also contemplates that the step of sliding a coupling nut over the tube uses a jam nut over the tube.

While this invention has been described with emphasis on the preferred embodiments, it should be understood that within the scope of the appended claims the invention might be practiced or carried out in other than as specifically described herein.

For example, the ferrules could be made of laminates or composites as well as metal. A variety of coatings could be used to reduce electrical conductivity with formulations optimized for the specific application The embodiments have been described in detail with particular reference to certain preferred embodiments thereof, but it will be understood that variations and modifications can be effected within the scope of the embodiments, especially to those skilled in the art.

What is claimed is:

1. A self energizing tube connector for engaging a pressurizable part comprising:

a. a tube capable of sustaining pressures up to 50,000 psi without deforming comprising an upstream tube end and a downstream tube end;

b. a ferrule assembly comprising:

i. a front ferrule;

ii. a rear ferrule;

iii. a lifting component, wherein the lifting component is a ring comprising an upstream edge and a downstream edge wherein the upstream edge has a diameter larger than the downstream edge and, wherein the lifting component slidingly engages the front ferrule to cause an upstream seal to form between the pressurizable part and the tube; and iv. a downstream seal between the front ferrule and the tube;

c. a coupling nut for sliding over the tube and disposed downstream of the rear ferrule for engaging the pressurizable part, wherein the coupling nut is adapted to tighten against the rear ferrule to tighten the front ferrule and lifting mechanism, thereby compressing the front ferrule against the pressurizable part and the tube.

2. The tube connector of claim 1, wherein the tube comprises an outer diameter ranging between about 1/16 inches to about 12 inches.

3. The tube connector of claim 2, wherein the tube comprises an outer diameter ranging between about 1/8 inches to about 1 inch diameter.

4. The tube connector of claim 1, wherein the front ferrule, the rear ferrule, and the lifting component comprise a deformable material that deforms upon compression with the coupling nut.

5. The tube connector of claim 4, wherein the deformable material is a metal or plastic.

6. The tube connector of claim 1, wherein the tube is a metal tube or a plastic tube.

7. The tube connector of claim 1, wherein a pressure in the tube ranges between 1 atm to 25,000 psi.

8. The tube connector of claim 1, wherein the coupling nut comprises a threaded engagement with the pressurizable part.

9. The tube connector of claim 1, wherein the pressurizable part is a down hole safety valve, a plurality of chemical injection assemblies, a plurality of tubing hangars, a plurality of blow out preventors, a plurality of subsea Christmas trees, or a plurality of packers.

10. The tube connector of claim 1, wherein the front ferrule comprises a conical shape for engaging the pressurizable part.

11. The tube connector of claim 1, wherein the coupling nut is a jam nut.

12. A self energizing tube connector for engaging a pressurizable part comprising:

a. a tube capable of sustaining pressures up to 50,000 psi without deforming comprising an upstream tube end and a downstream tube end;

b. a ferrule assembly comprising:

i. a front ferrule;

ii. a rear ferrule;

iii. a lifting component, wherein the lifting component is a ring comprising an upstream edge and a downstream edge, wherein the upstream edge has a diameter larger than the downstream edge an wherein the lifting component further comprises a groove disposed adjacent the upstream edge to prevent sealing at the upstream edge of the lifting component and, wherein the lifting component slidingly engages the front ferrule to cause an upstream seal to form between the pressurizable part and the tube; and iv. a downstream seal between the front ferrule and the tube;

c. a coupling nut for sliding over the tube and disposed downstream of the rear ferrule for engaging the pressurizable part, wherein the coupling nut is adapted to tighten against the rear ferrule to tighten the front ferrule and lifting mechanism, wherein the coupling nut compresses the front ferrule against the pressurizable part and the tube.

* * * * *